(12) United States Patent
Tabata et al.

(10) Patent No.: US 6,462,841 B1
(45) Date of Patent: Oct. 8, 2002

(54) IMAGE SENSOR, AND IMAGE PROCESSING APPARATUS USING THE SAME

(75) Inventors: Masami Tabata, Isehara; Tatsundo Kawai, Hadano, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/054,595

(22) Filed: Apr. 3, 1998

(30) Foreign Application Priority Data

Apr. 10, 1997 (JP) .............................. 9-092344

(51) Int. Cl.$^7$ ................................. H04N 1/04
(52) U.S. Cl. ....................... 358/475; 358/474
(58) Field of Search ................ 358/471, 482, 358/483, 475, 513, 474; 250/208.1

(56) References Cited

U.S. PATENT DOCUMENTS

| | | | | |
|---|---|---|---|---|
| 4,675,534 A | * | 6/1987 | Sekimura et al. | 250/578 |
| 4,733,096 A | * | 3/1988 | Horiguchi | 250/578 |
| 4,733,098 A | * | 3/1988 | Seito | 250/578 |
| 5,060,084 A | * | 10/1991 | Kawahara et al. | 353/472 |
| 5,187,377 A | * | 2/1993 | Katoh | 257/89 |
| 5,254,847 A | * | 10/1993 | Hata et al. | 250/208.1 |
| 5,260,813 A | * | 11/1993 | Sato | 358/482 |
| 5,327,250 A | * | 7/1994 | Ikeda | 358/401 |
| 5,399,850 A | * | 3/1995 | Nagatani et al. | 358/496 |
| 5,434,681 A | * | 7/1995 | Imamura et al. | 358/471 |
| 5,489,995 A | * | 2/1996 | Iso et al. | 358/483 |
| 5,493,143 A | * | 2/1996 | Hokari | 257/432 |
| 5,818,033 A | * | 10/1998 | Takeda et al. | 358/482 |
| 5,841,128 A | * | 11/1998 | Shibuya et al. | 358/471 |
| 5,926,287 A | * | 7/1999 | Suzuki et al. | 358/483 |
| 5,965,870 A | * | 10/1999 | Tabata | 250/208.1 |
| 6,002,494 A | * | 12/1999 | Tabata | 358/475 |
| 6,172,356 B1 | * | 1/2001 | Ogura | 250/227.11 |
| 6,181,442 B1 | * | 1/2001 | Ogura | 358/475 |
| 6,343,162 B1 | * | 1/2002 | Saito | 382/312 |

FOREIGN PATENT DOCUMENTS

| | | | | |
|---|---|---|---|---|
| EP | 0495191 A2 | * | 7/1992 | G06K/9/20 |
| JP | 9-22268 | * | 1/1997 | G09G/3/14 |
| JP | 9-275469 | * | 10/1997 | H04N/1/04 |
| JP | 63-280564 | * | 11/1998 | H04N/1/028 |

* cited by examiner

Primary Examiner—Jerome Grant, II
(74) Attorney, Agent, or Firm—Morgan & Finnegan, LLP

(57) ABSTRACT

An image sensor comprises signal generation unit for generating an image signal on the basis of reflected light using a plurality of photoelectric converters arranged on a substrate, and image forming unit for projecting the reflected light, from an original image, within a predetermined area on the substrate on which the signal generation unit is provided, wherein the signal generation unit includes signal output unit for outputting the image signal from the plurality of photoelectric converters to the outside of the signal generation unit, and a part or all of the signal output unit is arranged outside of the predetermined area on the substrate. Accordingly, reflection of light by the electrodes is prevented, and no light noise incidents on the photoelectric converters. Therefore, it is possible to increase the S/N ratio of the image sensor.

33 Claims, 6 Drawing Sheets

IMAGE SENSOR, AND IMAGE PROCESSING APPARATUS USING THE SAME

BACKGROUND OF THE INVENTION

The present invention relates to an image sensor and, more particularly, to an image sensor which detects reflected light from an original image using photoelectric converters and generates image signals, and an image processing apparatus using the image sensor.

Figure 10:
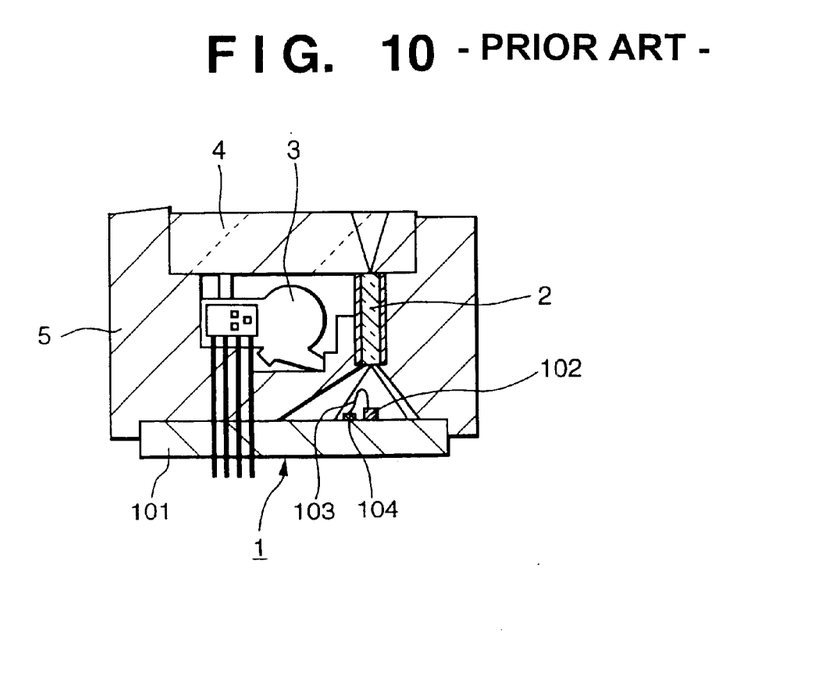
FIG. 10 is a cross-sectional view of a conventional image sensor.

FIG. 10 is a cross-sectional view showing a configuration of a conventional image sensor of the aforesaid type. Referring to FIG. 10, the image sensor is basically configured with a sensor array 1 composed of a sensor substrate 101 and sensor ICs 102 mounted on the sensor substrate 101, an lens array 2, an illumination device 3 for illuminating an original image, a cover glass 4, and a frame 5 for holding the foregoing elements and devices at fixed positions.

Figure 11:
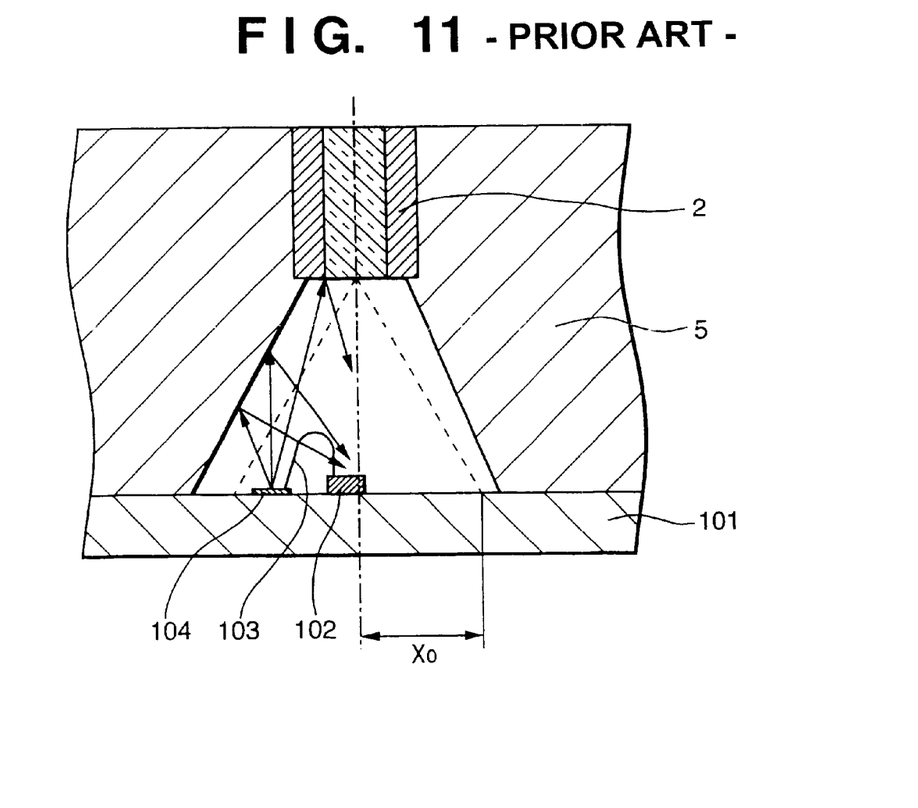
FIG. 11 is a view showing a focusing area of a lens array of the conventional image sensor.

The lens array 2 is formed by arranging a plurality of rod lens elements, each of which functions as a lens by graduating index of refraction from the peripheral portion toward the central portion of the lens element, in a line. The lens array 2 propagates reflected light from the original image and forms an image on the sensor ICs 102. An imaging area on the sensor substrate 101 is shown in detail in FIG. 11. In FIG. 11, $X_0$ denotes the radius of the imaging area. Since imaging areas of the lens elements having radius $X_0$ overlap to each other, although it is not shown in FIG. 11, the overall imaging area of the lens array 2 on the sensor substrate 101 has a band shape whose width is X ($=2 \times X_0$).

As shown in FIGS. 10 and 11, the sensor IC 102 is electrically connected with the sensor substrate 101 via an electric connection portion 104 and a conductive thin wire 103. Further, the surface of the electrical connection portion 104 of the sensor substrate 101 is formed with metals, such as gold and silver, and the portion 104 is formed within the imaging area of the lens array 2.

However, the reflectivity of metals, such as gold and silver, forming the electrical connection portion 104 on the sensor substrate 101 of the aforesaid conventional image sensor is high. Accordingly, when light propagated through the lens arrays 2 incidents on the electrical connection portion 104, the light is mostly reflected by the metal and becomes stray light. As a result, there is a problem in which the stray light incidents on photo-sensing portions of the sensor ICs 102 as light noise, which causes deterioration of the S/N ratio of sensor output.

SUMMARY OF THE INVENTION

The present invention has been made in consideration of the above situation, and has as its object to provide an image sensor whose S/N ratio is improved.

According to the present invention, the foregoing object is attained by providing an image sensor comprising: signal generation means for generating an image signal on the basis of reflected light using a plurality of photoelectric converters arranged on a substrate; and image forming means for projecting the reflected light, from an original image, within a predetermined area on the substrate on which the signal generation means is provided, wherein the signal generation means includes signal output portions for outputting the image signal from the plurality of photoelectric converters to the outside of the signal generation means, and a part or all of the signal output portions is arranged outside of the predetermined area on the substrate.

With the present invention as described above, since incoming light does not incident on electrodes on the sensor substrate, no light is reflected by the electrodes, thereby no noise light incidents on a photoelectric converter.

It is another object of the present invention to provide a down-sized and down-weighed image sensor.

According to the present invention, the foregoing object is attained by providing the image sensor comprising aperture stop for reducing the diameter of the imaging area of the lens.

With the present invention as described above, mounting density of the photoelectric converters and electrodes on the sensor substrate can be increased.

It is another object of the present invention to provide an image processing apparatus capable of performing high quality scanning of an image.

According to the present invention, the foregoing object is attained by providing an image processing apparatus comprising: original feeding means for feeding an original image; reading means for reading the original image using an image sensor and generating image signals; print medium feeding means for feeding a print medium; and print means for printing an image on the print medium on the basis of the image signals read by the reading means, wherein the image sensor used in the reading means comprises: signal generation means for generating an image signal on the basis of light information using a plurality of photoelectric converters arranged on a substrate; and image forming means for projecting the light information, from the original image, within a predetermined area on the substrate on which the signal generation means is provided, wherein the signal generation means includes signal output portions for outputting the image signal from the plurality of photoelectric converters to the outside of the signal generation means, and a part or all of the signal output portions is arranged outside of the predetermined area on the substrate.

With the present invention as described above, it is possible to install an image sensor having a good S/N ratio of sensor output to an image processing apparatus.

The invention is particularly advantageous since the S/N ratio of the output from the image sensor is improved and it is possible to provide an image sensor and an image processing apparatus capable of performing high-quality scanning of an image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

First Embodiment

Figure 1:
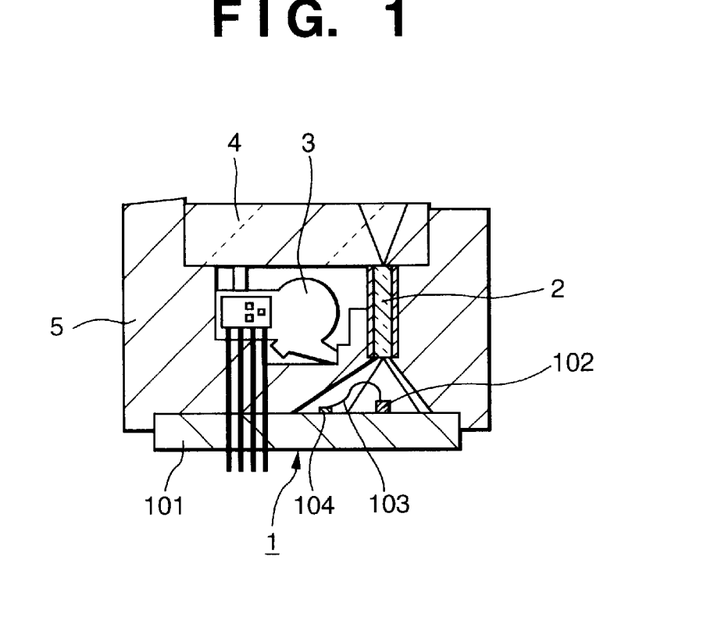
FIG. 1 is a cross-sectional view of an image sensor according to a first embodiment of the present invention.
Figure 2:
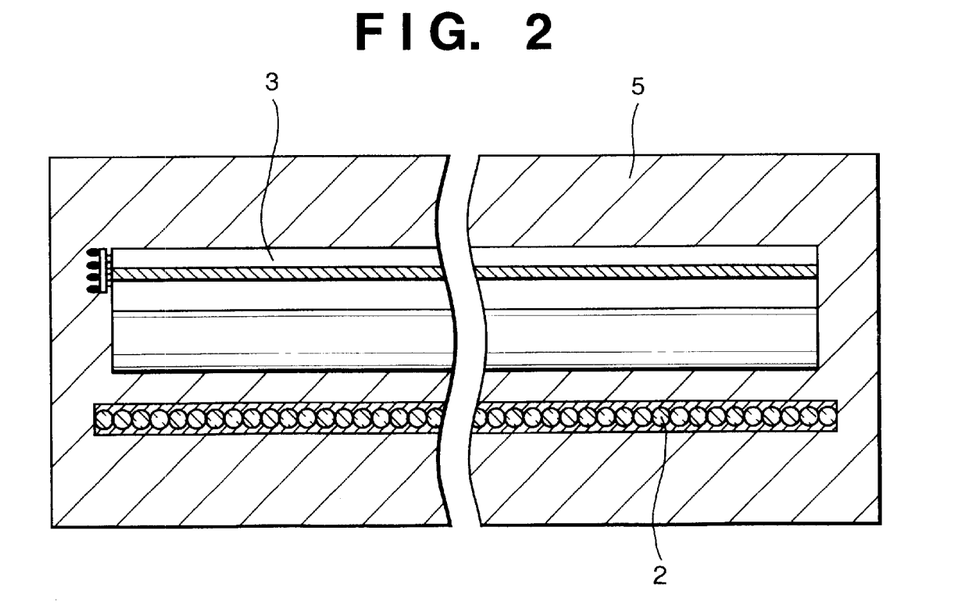
FIG. 2.is a top view of the image sensor according to the first embodiment.

FIG. 1 is a cross-sectional view of an image sensor according to the first embodiment of the present invention, and FIG. 2 is a top view of the image sensor. Referring to FIGS. 1 and 2, the image sensor comprises a sensor array 1 of a predetermined number of sensor ICs 102, having line-shaped photoelectric converters, precisely arranged in a line on a sensor substrate 101 made of, e.g., epoxy glass; a lens array 2 for transmitting reflected light from an original image thereby forming an image on the sensor array 1; an illumination device 3 for illuminating the original image; a cover glass made of transparent material for holding the original image; a frame 5 made of metal, such as aluminum, or resin, such as a polycarbonate, for supporting the foregoing elements and units at fixed positions.

Further, reference numeral 104 denotes a electrical connection portion, and reference numeral 103 denotes a gold wire connecting between the sensor IC 2 and the connection portion 104.

Next, a basic function of the image sensor is explained. An original image, held by being pressed against the cover glass, is illuminated obliquely by the illumination device 3 while sequentially changing colors of light, red (R), green (G), and blue (B). An optical images of the original image illuminated by the R, G and B light are formed on the sensor ICs 102 by the lens array 2. The sensor ICs 102 convert the respective optical images into electric signals and transmits them to a system where these electric signals are processed and a color image is reproduced.

In the above description, a case of reading the original image by receiving reflected light from it is explained, however, the present invention is applicable to a system, having an image sensor and an illumination device which is provided independently of the image sensor, for reading a transparent original image by receiving light transmitted through it.

Figure 3:
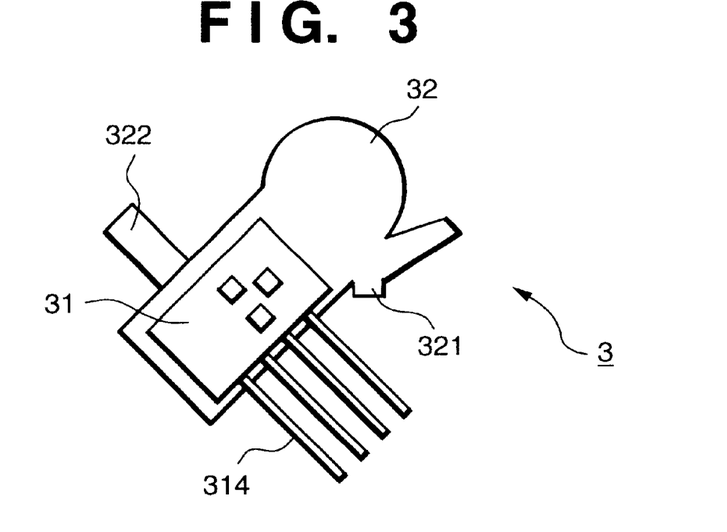
FIG. 3 is a side view of an illumination device according to the first embodiment.
Figure 4:
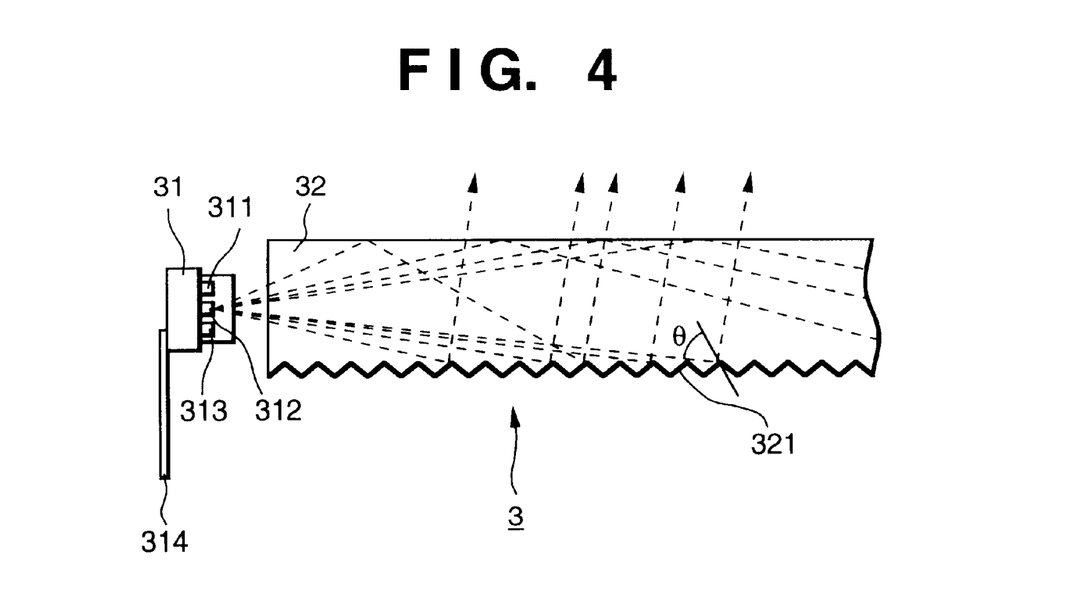
FIG. 4 is a view showing an operation of the illumination device according to the first embodiment.

FIG. 3 is a side view of the illumination device 3, and FIG. 4 is a detail view of the illumination device 3 showing an operation of the illumination device 3. Referring to FIGS. 3 and 4, the illumination device 3 is basically configured with an LED light source 31 packaged with a red (R) LED 311, a green (G) LED 312, and a blue (B) LED 313, and a light guide 32 made of a material, such as acrylic resin, having excellent light transmission characteristics. Further, reference numeral 321 is a notch portion of the light guide 32; and 322, a position fixer. These elements will be described later in detail. Furthermore, reference numeral 314 denotes a lead for electrically connecting between the LED light source 31 and the sensor substrate 101. In the LED light source 31, the wavelength of the R LED 311 at the peak intensity is selected between 600 and 660 nm, that of the G LED 312 is selected between the 510 and 550 nm, and that of the B LED 313 is selected between the 430 to 480, for realizing good color reproduction.

The LED light source 31 is arranged so that emitted light enters the light guide 32 from one or both ends of the light guide 32. The entered light propagates inside of the light guide 32 by being fully reflected at the boundary between the air and the light guide 32, repeatedly. Further, fine notches (notch portion 321) are formed along the length of the light guide 32, as shown in the detail view of the illumination device 3 in FIG. 4. When the light incidents on the notch portion 321, it is reflected at a different angle from when it reflected by other boundaries of the light guide 32. More specifically, the traveling path of the light is greatly changed toward the original image (to upward in FIG. 4) when the light is reflected by the notch portion 321, thereby the incidence angle of this reflected light on the boundary between the air and the light guide 32 is less than the critical angle. In this manner, the light can be controlled to exit from the light guide 32 in the desired direction.

The notch portion 321 may be made reflective by depositing aluminum or printing silver or white ink, or may be designed to change the light path by only utilizing characteristics of the critical angle. Alternatively, without the notch portion 321, by simply printing white ink or roughening the surface, corresponding to the notch portion 321, of the light guide 32, for instance, similar effect of the notch portion 321 is also achieved.

In order to make the intensity of light illuminating the original image uniform, the width of notch is widened or width of the printed area, when printing white ink, is gradually widened in proportion to the distance from the light source 31. Further, by covering a portion other than a portion where light should exit from the light guide 32, with a white member having good reflectance of light, for instance, loss of light upon propagating along the light guide 32 is reduced, thereby increasing the illuminance of the original image.

The lens array 2 is configured with a plurality of rod lens elements 201 (FIG. 5), precisely arranged in line, each of which functions as a lens by graduating index of refraction from the peripheral portion toward the central portion of the lens element manufactured by ion exchange.

Figure 5:
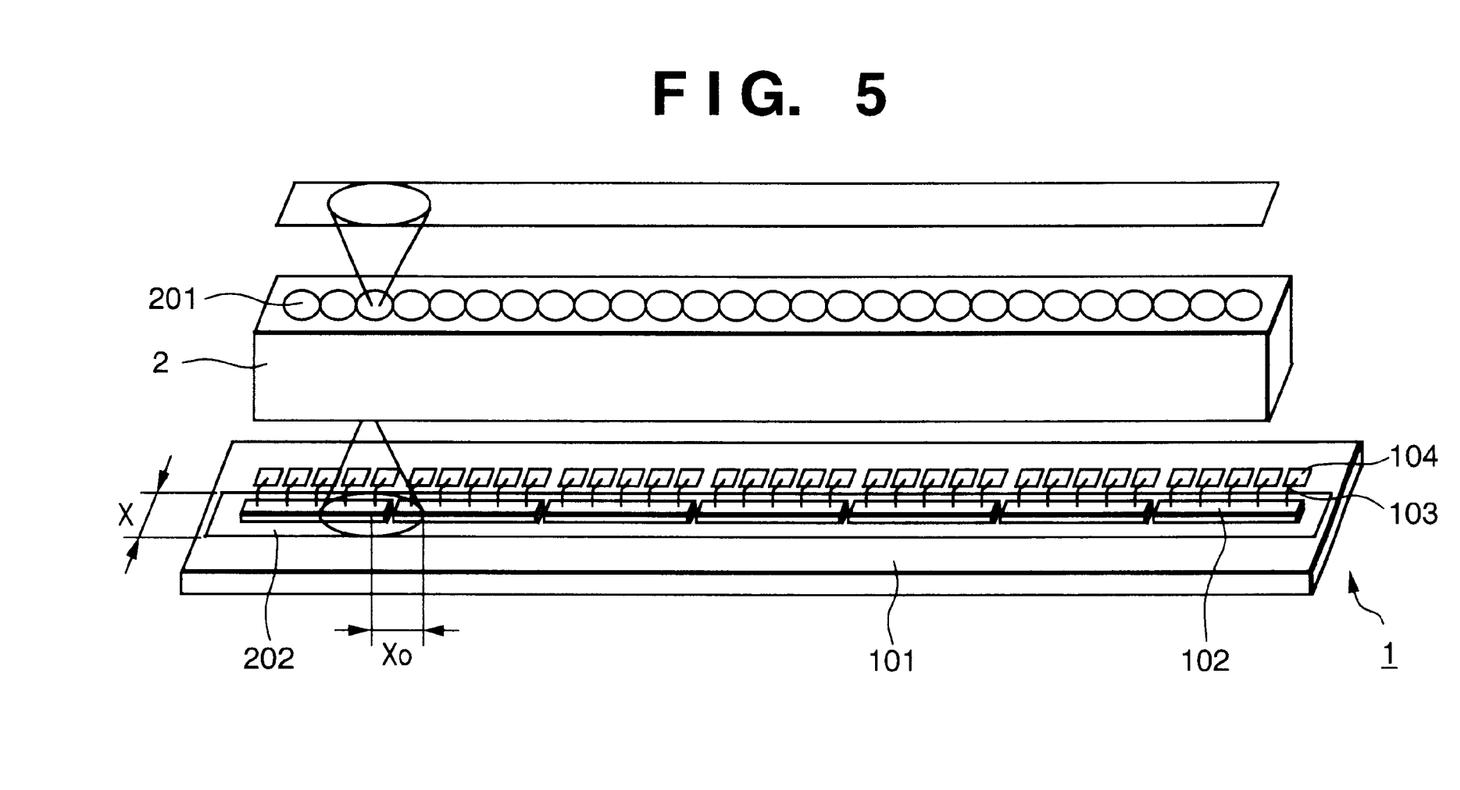
FIG. 5 is a perspective view of the image sensor for showing an imaging area of a lens array according to the first embodiment.

The imaging area of the lens array 2 is shown in FIG. 5. The imaging area of one of the lens elements 201, forming the lens array 2, when light reflected by the original image incidents on the sensor ICs 102 is shown by a circle of radius $X_0$. Since imaging areas of the lens elements 201 overlay from each other, an overall imaging area 202 of the lens array 2 has a band shape having a width $X$ ($=2 \times X_0$) on a plane.

Further, on the sensor array 1, the plurality of line-shaped sensor ICs 102 having a plurality of photoelectric converters are adhered in line, so as to stretch for a predetermined length, on the sensor substrate 101 made of, e.g., epoxy glass, by an adhesive. The sensor ICs 102 and the sensor substrate 101 are connected via the gold wires 103 so as to provide power and electric signals for operating the sensor ICs 102 from the sensor substrate 101 to the sensor ICs 102, and to transfer output signals from the sensor ICs 102 to the sensor substrate 101 for providing the output to a system which processes the output signals. On the surfaces of the electrical connection portions 104 where the sensor substrate 101 is connected to the gold wires 103, metal film of gold or silver, for instance, which have good connectivity with gold is formed by electroplating.

Note, in the conventional image sensor, the electrical connection portions 104 are arranged within the imaging area 202 of the lens array 2. Since reflectance of the surface of the electrical connection portions 104 is much higher than other portions of the sensor substrate 101, due to lustrous characteristics of metal forming the electrical connection portions 104, when light propagated via the lens array 2 incidents on the electrical connection portions 104, most of the incident light is reflected. A part of this reflected light is further reflected by the internal surface of the frame 5 or the surface of the lens array 2, and this reflected light becomes stray light, which would incident on photo-sensing portions of the sensor ICs 102 as noise light. This deteriorates the S/N ratio of the sensor ICs 102.

In the first embodiment, the electrical connection portions 104 of high reflectance are provided outside of the imaging area 202 of the lens array 2 on the sensor substrate 101, thereby preventing light propagated through the lens array 2 from incidenting on the electrical connection portions 104. Accordingly, no stray light, i.e., light reflected by the electrical connection portions 104, incidents on the photo-sensing portions of the sensor ICs 102, thereby improving the S/N ratio of the sensor ICs 102.

Note, the electrical connection portions 104 are where the gold wires 103 are connected on the sensor substrate 101, and how the gold wires 103 are connected to the sensor substrate 101 is not limited to above. Further, medium for electrically connecting between the sensor ICs 102 and the electrical connection portions 104 is not limited to the gold wires 103, and aluminum wires or wires made of other conductive material may be used.

Figure 6:
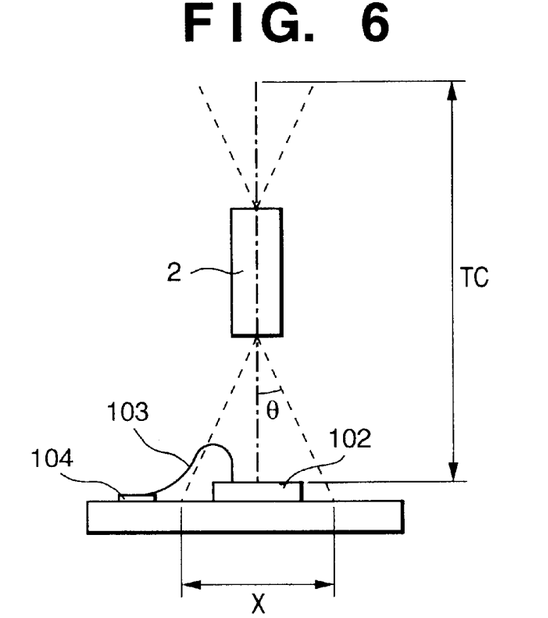
FIG. 6 is a cross-sectional schematic representation showing an arrangement of an electrical connection portion of a sensor substrate according to the first embodiment.
Figure 7:
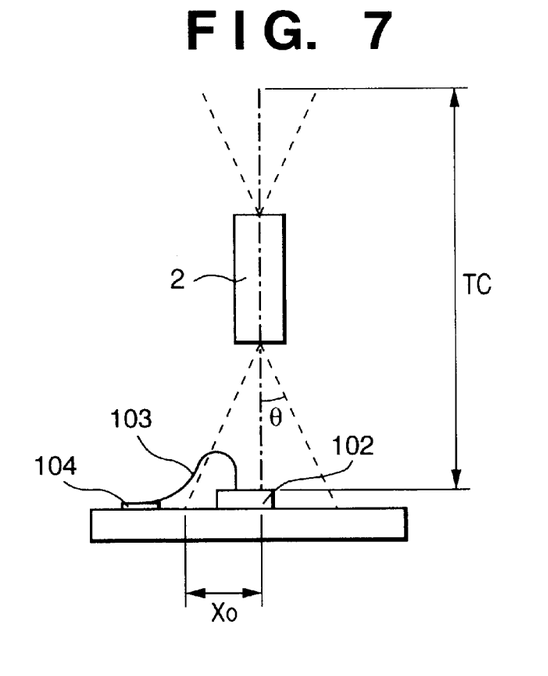
FIG. 7 is a cross-sectional schematic representation showing another arrangement of the electrical connection portion of the sensor substrate according to the first embodiment.

FIGS. 6 and 7 are cross-sectional schematic representations showing examples of arrangements of the sensor ICs 102 according to the first embodiment of the present invention. In FIGS. 6 and 7, TC is a length between the conjugate planes. In this case, the lens array 2 of the image sensor is set at a position where the photo-sensing surfaces of the ICs 102 and the original image are on the conjugate planes of the lens array 2. In other words, the length TC is the distance between the photo-sensing surfaces of the ICs 102 and the original image. In FIG. 6, each photo-sensing surface is provided at approximately the center of each of the sensor ICs 102, and the width of the sensor IC 102 is narrower than the width X of the imaging area of the lens array 2. Further, in FIG. 7, the sensor IC 102 is arranged so that an edge portion of the sensor IC 102 is placed near the central axis of the lens array 2, and the width of the sensor ICs 102 is narrower than the radius $X_0$ of the imaging areas of the lens elements 201 forming the lens array 2. In either case, the electrical connection portions 104 are provided outside of the imaging area (width X) of the lens array 2.

Note, all the electrical connection portions 104 are not necessarily provided outside of the imaging area of the lens array 2, and by providing a part of the electrical connection portions 104, at least, outside of the imaging area, less stray light is produced, compared to the conventional arrangement, thus effective.

A method for manufacturing the image sensor according to the first embodiment is briefly explained with reference to FIGS. 1 and 3.

First, the illumination device 3 and the lens array 2 are inserted into predetermined grooves formed on the frame 5, thereby the positions of these elements are determined both in the lengthwise direction and in the widthwise direction. Next, the position fixer 322 of the illumination device 3 is pressed against the top surface of the lens array 2 by the cover glass 4. Under this state, the cover glass 4 is adhered to two flat portions of the frame 5, which are approximately on the same plane of the upper surface of the lens array 2, and the illumination device 3 and the lens array 2 are arranged between the two flat portions. Accordingly, it is possible to precisely place and fix the illumination device 3 and the lens array 2 in position. Therefore, it is possible for the illumination device 3 to correctly emit light toward a desired direction, thus, reflected light is properly focused by the lens array 2 throughout its length.

Then, the sensor array 1 on which the electrical connection portions 104 for connecting between the sensor substrate 101 and the sensor ICs 102 are provided, on the sensor substrate 101, outside of the imaging area of the lens array 2 is fit into the frame 5, and the sensor array 1 is adhered to the frame 5 by an adhesive or fixed to the frame 5 by caulking a part of the frame 5. Then, the lead 314 of the illumination device 3 is electrically connected to the sensor substrate 101 with, e.g., solder, and the image sensor according to the first embodiment is completed.

Modification of the First Embodiment

Next, a modification of the first embodiment is explained.

Figure 8:
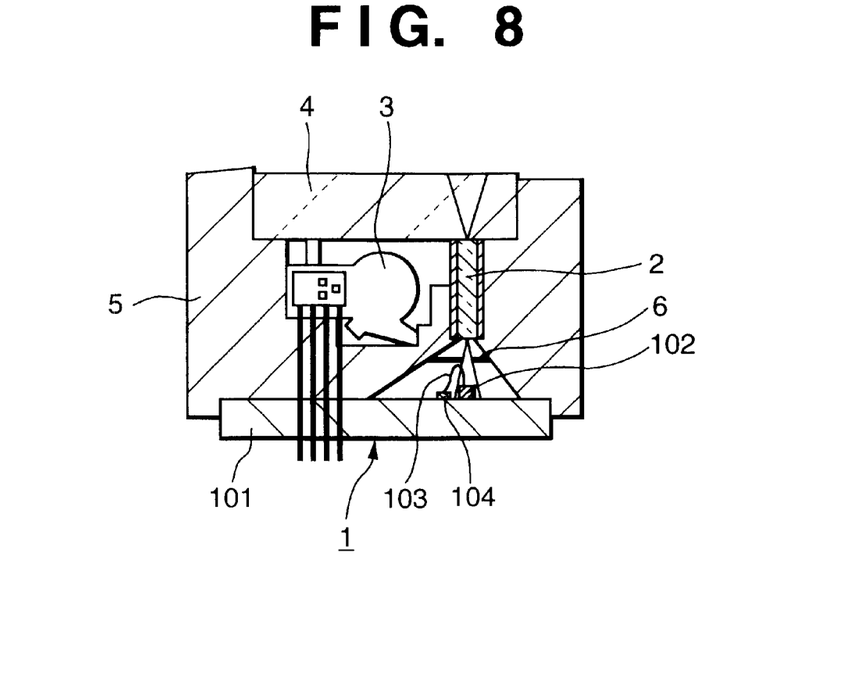
FIG. 8 is a cross-sectional view showing an image sensor according to a modification of the first embodiment.

FIG. 8 is a cross-sectional view of an image sensor according to the modification of the first embodiment. The image sensor is characterized in that an imaging area of the lens array 2 is narrowed by aperture stop 6 of, e.g., slits, provided between the lens array 2 and the sensor ICs 102.

By narrowing the imaging area of the lens array 2, it is possible to form the electrical connection portions 104, outside of the imaging area, at positions closer to the sensor ICs 102 compared to the configuration of the first embodiment. As a result, it is possible to increase the packaging density on the sensor substrate 101, therefore, it is possible to reduce the size of the sensor substrate 101. Accordingly, it is possible to downsize the image sensor as well as an image processing apparatus using this type of image sensor.

Further, by reducing the diameter of each lens element configuring the lens array 2, it is also possible to reduce the imaging area of the lens array 2, which can achieve the same effect as described above.

Second Embodiment

Next, an example when the image sensor of the present invention is applied to an image processing apparatus is explained with reference to figures.

Figure 9:
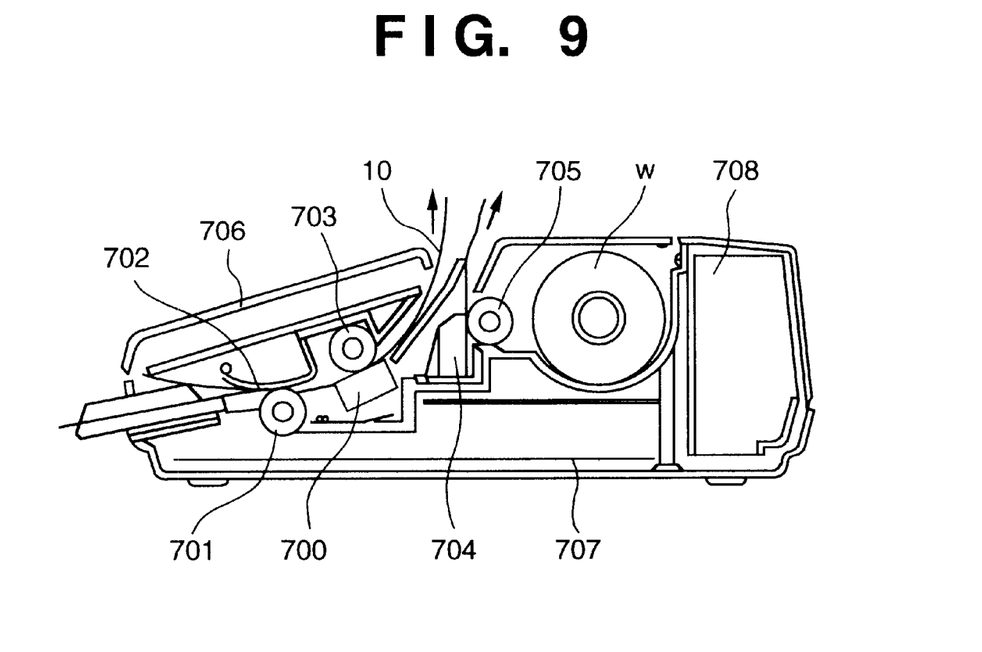
FIG. 9 is a cross-sectional view of an image processing apparatus according to a second embodiment.

For example, a facsimile apparatus may be configured using an image sensor of the present invention. FIG. 9 is a cross-sectional view of a facsimile apparatus according to the second embodiment of the present invention. In FIG. 9, reference numeral 701 denotes a feeding roller for feeding an original image 10 to a reading position; 702, a separation claw for separating pages of the original image 10 to be fed one by one; and 703, a conveyance roller, provided at the reading position of a photoelectric conversion unit 700, for conveying the original image 10 pass the reading position.

Here, the photoelectric conversion unit 700 comprises the image sensor of the present invention and configures an image reading unit which generates image data by illuminating the original image 10 and receiving the reflected light.

Further, reference character W denotes a print medium in a form of a rolled paper on which images are printed on the basis of image information read by the photoelectric conversion unit 700 or image information received from outside, in a case of a facsimile apparatus, for instance. Further, reference numeral 704 denotes a printhead for printing an image, and a thermal head and a bubble-jet printhead, for instance, may be used as the printhead 704. The printhead 704 may be of a serial type or a line type.

Reference numeral 705 denotes a platen roller for conveying the print medium W to the print position of the printhead 704 thereby controlling the print position of the print medium W; 706, an operation panel, including a display unit, where an operation instruction, for example, is inputted; 707, a system control board on which a control unit for controlling respective units and elements of the facsimile apparatus, an operation circuit for operating the photoelectric conversion unit 700, a processing unit for processing image information, a transmission/reception unit, and so on, are provided; and 708, a power supply for the apparatus.

Note, in addition to the facsimile apparatus, it is also possible to apply the image sensor of the present invention to an information processing apparatuses, such as an image scanner, which do not have a printhead for forming an image and transmit read image information to a computer or on a network.

Further, in the second embodiment, a case where reading operation is performed while moving the original image 10, however, the present invention is not limited to this, and reading operation may be performed by moving the photoelectric conversion unit 700 while fixing the position of the original image 10, for example. In other words, relative position between the original image 10 and the photoelectric conversion unit 700, including the image sensor is to be moved while performing reading operation.

According to the second embodiment as described above, by using an image sensor, whose S/N ratio is improved, to input an image to an image processing apparatus, it is possible to provide an image processing apparatus capable of performing high quality reading of an image.

The present invention is not limited to the above embodiments and various changes and modifications can be made within the spirit and scope of the present invention. Therefore to apprise the public of the scope of the present invention, the following claims are made.

What is claimed is:

1. An image sensor comprising:
    a signal generation unit adapted to generate an image signal on the basis of light information using a plurality of photoelectric converters arranged on a substrate;
    an image projecting unit adapted to project the light information from an original image, within a predetermined area on the substrate, said predetermined area being larger than the surface area of the signal generation unit; and
    a connection unit adapted to electrically connect said photoelectric converters with said substrate,
    wherein at least a part of said connection unit is arranged outside the predetermined area on the substrate, such that the light information is not incident on the connection unit.

2. The image sensor according to claim 1, wherein the plurality of photoelectric converters are arranged within the predetermined area on the substrate.

3. The image sensor according to claim 2, wherein the surface of said portions reflects light.

4. The image sensor according to claim 3, wherein said portions comprise a plurality of electrodes for connecting to the plurality of photoelectric converters.

5. The image sensor according to claim 4, wherein said connection unit adapted to electrically connect the plurality of photoelectric converters with a plurality of electrodes via conductive thin wires.

6. The image sensor according to claim 5, wherein conductive material of the surfaces of the plurality of electrodes appears.

7. The image sensor according to claim 2, wherein said image projecting unit is a lens array configure with a plurality of lenses.

8. The image sensor according to claim 7, wherein the size of each photoelectric converter is smaller than the diameter of an imaging area, on the substrate, of said lens.

9. The image sensor according to claim 7, wherein the size of each photoelectric converter is smaller than the radius of an imaging area, on the substrate, of said lens.

10. The image sensor according to claim 8 further comprising aperture stop for reducing the diameter of the imaging area of the lens.

11. The image sensor according to claim 10, wherein said aperture stop has a slit shape.

12. The image sensor according to claim 1 further comprising a unit adapted to illuminate the original image.

13. The image sensor according to claim 12, wherein said unit adapted to illuminate comprises a light source and a light guide for propagating light form the light source.

14. The image sensor according to claim 13, wherein said unit adapted to illuminate has an LED as the light source.

15. The image sensor according to claim 14, wherein said unit adapted to illuminate has a plurality of LEDs having different peak wavelengths.

16. The image sensor according to claim 13, wherein said light guide has a reflective dispersion portion for reflecting and dispersing light emitted by said light source.

17. The image sensor according to claim 1, wherein a pace between said image projecting unit and the substrate is covered by a member which reflects light.

18. An image processing apparatus comprising:
    a document feeder adapted to feed an original document;
    a reader adapted to read the original image using an image sensor and generating image signals;
    a print medium feeder adapted to feed a print medium; and
    a printer adapted to print an image on the print medium on the basis of the image signals read by said reading means,
    wherein said image sensor used in said unit adapted to read comprises:
        a signal generation unit adapted to generate an image signal on the basis of light information using a plurality of photoelectric converters arranged on a substrate;
        an image projecting unit adapted to project the light information, from an original image, within a predetermined area on the substrate, said predetermined area being greater than the surface area of the signal generation unit; and
        a connection unit adapted to electrically connect said photoelectric converters with said substrate,
        wherein at least a part of said connection unit is arranged outside the predetermined area on the substrate, such that the light information is not incident on the connection unit.

19. The image processing apparatus according to claim 18 further comprising a communication unit adapted to transmit and receive image signals.

20. An image processing apparatus comprising:
- a reader adapted to read an original image using an image sensor and generating image signals; and
- a signal processor adapted to apply a predetermined signal process to the image signals read by said reading means,
- wherein said image sensor used in said reader comprises:
    - a signal generation unit adapted to generate an image signal on the basis of light information using a plurality of photoelectric converters arranged on a substrate;
    - an image projecting unit adapted to project the light information, from an original image, within a predetermined area on the substrate, said predetermined area being greater than the surface area of the signal generation unit; and
    - a connection unit adapted to electrically connect said photoelectric converters with said substrate,
    - wherein at least a part of said connection unit is arranged outside the predetermined area on the substrate, such that the light information is not incident on the connection unit.

21. The image processing apparatus according to claim 20 further comprising a moving unit adapted to move said image sensor and the original image relatively to each other.

22. The image processing apparatus according to claim 21 further comprising a communication unit adapted to output image signals processed by said signal processor.

23. The image processing apparatus according to claim 22 further comprising a controller adapted to control said reader, said signal processor, said moving unit adapted to move, and said communication unit.

24. The image processing apparatus according to claim 21 further comprising a controller adapted to control said reader, said signal processor, and said moving unit adapted to move.

25. The image processing apparatus according to claim 20 further comprising a communication unit adapted to output image signals processed by said signal processing means.

26. The image processing apparatus according to claim 25 further comprising a controller adapted to control said reader, said signal processor, and said communication unit.

27. The image processing apparatus according to claim 20 further comprising a controller adapted to control said reader and said signal processor.

28. An image processing apparatus comprising:
- a reader adapted to read an original image using an image sensor and generating image signals; and
- a moving unit adapted to move said image sensor and/or the original image relatively to each other,
- wherein said image sensor used in said reader comprises:
    - a signal generation unit adapted to generate an image signal on the basis of light information using a plurality of photoelectric converters arranged on a substrate;
    - an image projecting unit adapted to project the light information, from an original image, within a predetermined area on the substrate, said predetermined area being greater than the surface area of the signal generation unit; and
    - a connection unit adapted to electrically connect said photoelectric converters with said substrate,
    - wherein at least a part of said connection unit is arranged outside the predetermined area on the substrate, such that the light information is not incident on the connection unit.

29. The image processing apparatus according to claim 28 further comprising a communication unit adapted to output image signals read by said reader.

30. The image processing apparatus according to claim 29 further comprising a controller adapted to control said reader, said moving unit adapted to move, and said communication unit.

31. The image processing apparatus according to claim 28 further comprising a controller adapted to control said reader and moving unit adapted to move.

32. An image processing apparatus comprising:
- a reader adapted to read an original image using an image sensor and generating image signals; and
- a controller adapted to control said reader,
- wherein said image sensor used in said reader comprises:
    - a signal generation unit adapted to generate an image signal on the basis of light information using a plurality of photoelectric converters arranged on a substrate;
    - an image projecting unit adapted to project the light information, from an original image, within a predetermined area on the substrate, said predetermined area being greater than the surface area of the signal generation unit; and
    - a connection unit adapted to electrically connect said photoelectric converters with said substrate,
    - wherein at least a part of said connection unit is arranged outside the predetermined area on the substrate, such that the light information is not incident on the connection unit.

33. The image processing apparatus according to claim 32 further comprising a communication unit adapted to output image signals read by said reader.

* * * * *